United States Patent
Grootaert et al.

(10) Patent No.: US 7,592,386 B2
(45) Date of Patent: Sep. 22, 2009

(54) DUAL CURE HYDROTALCITE CONTAINING FLUOROPOLYMER COMPOSITIONS

(75) Inventors: Werner M. A. Grootaert, Oakdale, MN (US); Robert E. Eggers, Arden Hills, MN (US)

(73) Assignee: 3M Innovative Properties Company, St. Paul, MN (US)

(*) Notice: Subject to any disclaimer, the term of this patent is extended or adjusted under 35 U.S.C. 154(b) by 492 days.

(21) Appl. No.: 11/561,677

(22) Filed: Nov. 20, 2006

(65) Prior Publication Data

US 2008/0116603 A1 May 22, 2008

(51) Int. Cl.
*C08K 3/26* (2006.01)

(52) U.S. Cl. ........................ 524/424; 524/436; 524/437; 525/326.3; 525/351; 525/352; 525/360; 525/366; 525/370; 525/374; 525/378; 525/379; 525/381; 525/382; 525/386; 525/387

(58) Field of Classification Search .................. 524/424, 524/436, 437; 525/326.3, 351, 352, 360, 525/366, 370, 374, 378, 381, 382, 386, 387
See application file for complete search history.

(56) References Cited

U.S. PATENT DOCUMENTS

| 5,266,650 A | 11/1993 | Guerra et al. |
| 5,374,484 A * | 12/1994 | Kasahara et al. ............ 428/421 |
| 5,585,449 A | 12/1996 | Arcella et al. |
| 6,166,157 A | 12/2000 | Hung et al. |
| 6,657,012 B2 | 12/2003 | Grootaert et al. |
| 6,794,457 B2 | 9/2004 | Grootaert |
| 6,825,300 B2 | 11/2004 | Grootaert et al. |
| 6,841,625 B2 | 1/2005 | Irie et al. |
| 2004/0054055 A1 | 3/2004 | Fukushi et al. |
| 2004/0142135 A1 * | 7/2004 | Verschuere et al. ...... 428/36.91 |
| 2005/0159557 A1 | 7/2005 | Fukushi et al. |
| 2007/0060698 A1 * | 3/2007 | Tomihashi et al. .......... 524/520 |

FOREIGN PATENT DOCUMENTS

| EP | 0 661 304 A1 | 7/1995 |
| EP | 0 769 521 A1 | 4/1997 |
| EP | 0 784 064 A1 | 7/1997 |
| EP | 1 112 311 B1 | 10/2003 |
| JP | 02151608 | 6/1990 |

OTHER PUBLICATIONS

RD 447069, Anonymous, "Peroxide Curable Fluorocarbon Elastomer", Derwent-ACC- No. 2007-03174, Jul. 2001.*
Anonymous, "Crosslinkable Fluorocarbon Elastomer Composition", Research Disclosure, Jul. 2001, p. 1155, vol. 447.

* cited by examiner

*Primary Examiner*—Bernard Lipman
(74) *Attorney, Agent, or Firm*—C. Michael Geise; Dena M. Ehrich

(57) ABSTRACT

Provided is a curable fluoropolymer composition comprising a fluoropolymer comprising interpolymerized units of tetrafluoroethylene, perfluoro(aliphatic vinyl)ether, and a nitrogen-containing cure site monomer; a catalyst to form crosslinks with the nitrogen-containing cure site monomer; an organic peroxide; a co-agent to participate in a peroxide cure; and a hydrotalcite compound. Also provided is an article comprising the cured fluoropolymer reaction product of the curable composition and a method for forming a shaped article.

24 Claims, No Drawings

DUAL CURE HYDROTALCITE CONTAINING FLUOROPOLYMER COMPOSITIONS

SUMMARY

The present invention relates to a curable fluoropolymer composition comprising a fluoropolymer comprising interpolymerized units of tetrafluoroethylene, perfluoro(aliphatic vinyl) ether, and a nitrogen-containing cure site monomer; a catalyst to form cross-links with the nitrogen-containing cure site monomer; an organic peroxide; a co-agent to participate in a peroxide cure; and a hydrotalcite compound.

In another aspect, the present invention relates to a cured article comprising the cured fluoropolymer reaction product obtained by reacting a fluoropolymer comprising interpolymerized units of tetrafluoroethylene, perfluoro(aliphatic vinyl)ether, and a nitrogen-containing cure site monomer, with a catalyst to form cross-links with the nitrogen-containing cure site monomer, an organic peroxide, and a co-agent to participate in a peroxide cure. The composition further comprises a hydrotalcite compound.

In a further aspect, the present invention relates to a method of curing a fluoropolymer. The fluoropolymer comprises interpolymerized units of tetrafluoroethylene, perfluoro(aliphatic vinyl) ether, and a nitrogen-containing cure site monomer. The method comprises reacting the fluoropolymer with a catalyst to form cross-links with the nitrogen-containing cure site monomer, an organic peroxide, a co-agent to participate in a peroxide cure, and a hydrotalcite compound.

In another aspect, the present invention relates to a method for forming a shaped article comprising mixing a fluoropolymer comprising interpolymerized units of tetrafluoroethylene, perfluoro(aliphatic vinyl)ether, and a nitrogen-containing cure site monomer, with a catalyst to form cross-links with the nitrogen-containing cure site monomer, an organic peroxide, a co-agent to participate in a peroxide cure; and a hydrotalcite compound to form a curable composition. The method further comprises shaping the curable composition to form a shaped composition and curing the shaped composition at a curing temperature. The method may optionally further comprise post-curing the shaped composition at a temperature above the curing temperature.

In yet a further aspect, the present invention relates to a curable fluoropolymer composition comprising a fluoropolymer comprising interpolymerized units of tetrafluoroethylene, perfluoro(aliphatic vinyl)ether, and a nitrogen-containing cure site monomer; a curative to form cross-links with the nitrogen-containing cure site monomer; an organic peroxide; a co-agent to participate in a peroxide cure; and a hydrotalcite compound.

One object of the present invention is to provide cured fluoroelastomer compositions having improved chemical resistance and in particular improved (i.e., decreased) volume swell in high temperature water and steam. Another object of the present invention is to provide cured fluoroelastomer compositions that have improved compression set resistance and lower volume swell in high temperature water and steam than identical formulations without hydrotalcite. A further object of the present invention is to provide materials with application in a number of industries including chemical handling (e.g., seals for pumps, hoses, gaskets, etc.).

The details of embodiments of the invention are set forth in the description below. Other features, objects, and advantages of the invention will be apparent from the description and from the examples and claims.

DETAILED DESCRIPTION

The hydrotalcite compound used in the present invention may comprise any natural or synthetic hydrotalcite compound or a mixture or equivalent thereof. Particularly suitable hydrotalcite compounds are Mg and/or Al hydrocarbonate minerals of synthetic or natural origin. Examples of natural compounds include Hydrotalcite $Mg_6Al_2(OH)_{16}CO_3.4H_2O$ and members of the hydrotalcite group, such as: Strichtite $Mg_6Cr_2(OH)_{16}CO_3.4H_2O$; Pyroaurite $Mg_6Fe(III)_2(OH)_{16}CO_3.4H_2O$; Desautelsite $Mg_6Mn(III)_2(OH)_{16}CO_3.4H_2O$; and the like.

The hydrotalcite compound may also be a synthetic hydrotalcite compound. Examples of synthetic hydrotalcite compounds include: $Mg_6Al_2(OH)_{16}CO_3.4H_2O$ (natural hydrotalcite, which may be synthetically produced), $Mg_{4.5}Al_2(OH)_{13}CO_3.3.5H_2O$, $Mg_{4.5}Al_2(OH)_{13}CO_3$, $Mg_4Al_2(OH)_{12}CO_3.3.5H_2O$, $Mg_5Al_2(OH)_{14}CO_3.4H_2O$, $Mg_3Al_2(OH)_{10}CO_3.1.7H_2O$, $Mg_3ZnAl_2(OH)_{12}CO_3.xH_2O$, and $Mg_3ZnAl_2(OH)_{12}CO_3$. Synthetic hydrotalcites that are commercially available include, for example, those available from Kisuma Chemicals BV, Veendam, the Netherlands, under the name DHT-4A™ and DHT-4V™ and ZHT-4A™; and Hycite™ 713 which is available from Ciba Specialty Chemicals, Basel, Switzerland.

Hydrotalcite compounds that can be used in connection with the present invention also include, in further embodiments, those represented by the following formula:

$$[(M_1^{2+})_a(M_2^{2+})_b](M^{3+})_y(OH)_{2x+3y-2}(A^{n-})_{y/n}\cdot wH_2O$$

wherein $M_1^{2+}$ represents at least one divalent metal selected from the group consisting of $Mg^{2+}$, $Ca^{2+}$, $Sr^{2+}$ and $Ba^{2+}$; $M_2^{2+}$ represents at least one divalent metal selected from the group consisting of $Zn^{2+}$, $Cd^{2+}$, $Pb^{2+}$ and $Sn^{2+}$; $M^{3+}$ represents a trivalent metal ion; $A^{n-}$ represents an n-valent anion such as $F^-$, $Cl^-$, $Br^-$, $NO_3^-$, $CO_3^-$, $SO_4^{2-}$, $Fe(CN)_6^{4-}$, $CH_3COO^-$, oxalic acid dianion or salicylic acid anion; a and b each independently represent a value of from 0 to 10, x represents the sum of a+b and has a value of from 1 to 10, y represents an integer of from 1 to 5 and w represents a real number.

The hydrotalcite compound is typically used in the fluoropolymer layer in an amount of from 0.3 to 20% by weight relative to the amount of fluoroelastomer and preferably between 0.5 and 10% by weight.

Suitable fluoropolymers comprise interpolymerized units of tetrafluoroethylene, perfluoro(aliphatic vinyl)ether, and a nitrogen-containing cure site monomer. Perfluoro(aliphatic vinyl)ethers include, for instance, those corresponding to the general formula:

$$CF_2=CF-O-R_f$$

wherein $R_f$ represents a perfluorinated aliphatic group that may contain one or more oxygen atoms. Particular perfluoro(aliphatic vinyl)ethers include those corresponding to the formula:

$$CF_2=CFO(R^a_fO)_n(R^b_fO)_mR^c_f$$

wherein $R^a_f$ and $R^b_f$ are different linear or branched perfluoroalkylene groups of from 1 to 6 carbon atoms, m and n are each independently from 0 to 10 and $R^c_f$ is a perfluoroalkyl group of from 1 to 6 carbon atoms. Specific examples of perfluoro(aliphatic vinyl)ethers include perfluoro(methyl vinyl) ether (PMVE), perfluoro(ethyl vinyl)ether (PEVE), perfluoro (n-propyl vinyl)ether (PPVE-1), perfluoro-(2-propoxypropyl vinyl)ether (PPVE-2), perfluoro-(3-methoxy-n-propyl vinyl)ether, $CF_2=CF-OCF_2-O(CF_2)_nCF_3$ wherein n is 0 to 6, and $CF_3-(CF_2)_2-O-CF(CF_3)-CF_2-O-CF(CF_3)-CF_2-O-CF=CF_2$.

The fluoropolymers described herein further comprise a nitrogen-containing cure site monomer or a combination of nitrogen-containing cure site monomers. Such nitrogen-containing cure site monomers include nitrile-group containing cure site monomers that may be used in the polymerization process to increase the amount of nitrile groups in the fluoropolymer. Particular nitrile group-containing cure site monomers include nitrile-containing fluorinated olefins and nitrile-containing vinyl ethers, such as:

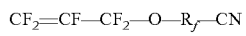

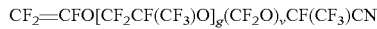

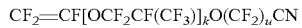

where, in reference to the above formulas, L is from 2 to 12; g is from 0 to 4; k is from 1 to 2; v is from 0 to 6; and u is from 1 to 4. $R_f$ is a perfluoroalkylene or a bivalent perfluoroether group. Examples of such a monomer include, for instance, perfluoro(8-cyano-5-methyl-3,6-dioxa-1-octene), $CF_2=CFO(CF_2)_5CN$, and $CF_2=CFO(CF_2)_3OCF(CF_3)CN$. Typically from 0.1 to about 5 mole percent (mol %) of these compounds are incorporated into the fluoropolymer as a cure site monomer. In some embodiments, the monomers are incorporated in from 0.2 to about 4 mol %, even from 1.3 to 2 mol %.

The fluoropolymers described herein may further comprise a nitrile end group. A nitrile end group may be obtained on a fluoropolymer by using a nitrile-containing salt or pseudohalogen in the initiation of the free radical polymerization of the fluorinated monomers. Suitable nitrile group-containing salts for use in the polymerization include those that have the nitrile group in the anion of the salt and in particular those that correspond to the formula:

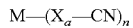

where M represents a mono- or multi-valent cation including a metal cation or ammonium. X is O, S, Se, or N; a has a value of 0 or 1; and n corresponds to the valence of the cation. Suitable cations, M, include organic (e.g., tetraalkylammonium cations) and inorganic cations. Particularly useful are ammonium and metal cations including mono-valent cations such as sodium and potassium, as well as divalent cations such as calcium and magnesium. Examples of potassium salts include potassium cyanide, potassium cyanate, and potassium thiocyanate.

Further methods for providing a nitrile end group in a fluoropolymer include converting an amide group contained in a fluoropolymer chain into a nitrile group in the presence of a dehydrating agent as described in U.S. Pat. No. 6,841,625. Alternatively, or additionally, iodoperfluoroalkylnitriles may be used as chain transfer agents in the free radical polymerization to provide nitrile end groups, as described in U.S. Pat. No. 6,166,157.

Further, a pseudohalogen nitrile-containing compound can be used to provide nitrile end groups. Psuedohalogen nitrile-containing compounds are compounds that have one or more nitrile groups and that behave analogously to compounds in which the nitrile group or groups is/are replaced with a halogen atom. Hence the term "pseudohalogen". Specific examples of pseudohalogen nitrile-containing compounds for use in the polymerization include NC—CN, NC—S—S—CN, NC—Se—Se—CN, NC—S—CN, NC—Se—CN, Cl—CN, Br—CN, I—CN, and NC—N=N—CN.

The amount of nitrile group-containing salt and/or pseudohalogen compound is generally selected relative to the amount of the polymerization initiator. The ratio may be selected such that the amount of nitrile end groups according to FT-IR measurements (as described in U.S. Pat. No. 6,825,300 B2 to Grootaert et al.) is at least 0.0002, at least 0.0004, or even at least 0.0001. Typically, the molar ratio of the nitrile groups contained in the nitrile salt or pseudohalogen compound to initiator is from 10:1 to 1:100, or even from 2:1 to 1:50.

In some embodiments, when an elastomer is desired, the fluoropolymer will be cured. The fluoropolymer may be cured in any manner that causes the fluoropolymer chains to link with each other, thereby forming a three dimensional network. Such components may include a catalyst to form cross-links with a nitrogen-containing cure site monomer, an organic peroxide, and a co-agent to participate in a peroxide cure. In some embodiments, the cross-links formed with the nitrogen-containing cure site monomers are triazine cross-links.

Catalysts to form triazine cross-links include compounds that are solid or liquid at ambient conditions but that cause cross-linking under conditions of cure. Such compounds include, for instance, metal-containing compounds of the formula:

where $A^{w+}$ is a metal cation such as $Cu^{2+}$, $Co^{2+}$, $Co^{3+}$, $Cu^+$, and $Ni^{2+}$; w is equal to the valence of the metal cation; $Y^{w-}$ is a counterion, typically a halide, sulfate, nitrate, acetate, or the like; and v is an integer of from 1 to about 7. Such catalysts also include other ammonia generating compounds such as urea; hexamethylenetetramine (urotropin); carbamates; $HCF_2CF_2CH(CH_3)OCONH_2$; urea hydrochloride; thiourea; amides such as phthalamide; specific metal amine complexes such as tetraamine copper (II) sulfate hydrate; ammonia-Lewis acid adducts; carboxamides, such as oxamic acid; biuret; unsubstituted amidines, such as formamidine, formamidine hydrochloride, and formamidine acetate; an ammonium salt of an organic or inorganic acid, as well as other described in EP 1,112,311 (Maclachlan et al.). The ammonia-generating compounds may, for instance, decompose at temperatures between 40 and 330° C., for instance, between 90 and 220° C., to produce ammonia.

Other useful catalysts to form triazine cross-links include substituted and unsubstituted triazine derivatives such as those represented by the formula:

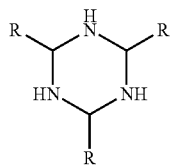

where each R is independently a hydrogen or a substituted or unsubstituted alkyl, aryl, or aralkyl group having from 1 to about 20 carbon atoms. Specific triazine derivatives include hexahydro-1,3,5-s-triazine and acetaldehyde ammonia trimer.

In further embodiments, the catalysts to form triazine cross-links include compounds having the general formula X—Y(—Z)$_n$. In this formula, X is a moiety represented by the Formula I:

wherein each R is, independently, H, an optionally substituted alkyl, alkenyl, aryl, alkaryl, or alkenylaryl group; Y is a bond or a multi-valent linking group; Z is H or a moiety according to Formula I, which may be the same or different than X, and n is an integer of from 1 to 3. That is, the catalyst, in these embodiments, may include an amidine, a bis-amidine, a tris-amidine, or a tetra-amidine. In addition, the amidine-containing curatives may comprise a salt of an XYZ$_n$ material or the precursors of a salt of an XYZ$_n$ material can be provided separately or as a mixture. When a salt is used, the anion may include, for instance, a perfluorinated carboxylate anion such as perfluoroadipate.

Further catalyst embodiments include, for instance, imidates having the formula $R^1C(OR^2)$=NH, and salts thereof, wherein $R^1$ and $R^2$, independently, are a substituted or unsubstituted alkyl, aryl, aralkyl, or alkenyl group. $R^1$ and $R^2$ each may have from 1 to 20 carbon atoms. Examples of substituents in substituted $R^1$ and $R^2$ groups include halogen (e.g., chlorine, fluorine, bromine, and iodine), cyano, alkoxy, and carboxy groups. In addition, one or more of the carbon atoms may be substituted by a heteroatom such as oxygen or nitrogen. Specific examples of useful groups include fluoroalkyl (e.g., a $C_1$ to $C_{20}$ fluoroalkyl group), perfluoroalkyl (e.g., a $C_1$ to $C_{20}$ perfluoroalkyl group), and perfluoropolyethers groups such as those described in U.S. Pat. No. 5,266,650. In particular embodiments, $R^1$ is a perfluoroalkyl group and $R^2$ is a $C_1$ to $C_{10}$ alkyl group. In yet further embodiments, $R^1$ may be substituted with a second imidate group (i.e., a —$C(OR^2)$=NH group. The imidates may be used, for instance, in their HCl-salt form, or as a salt of another inorganic or organic acid. The level of imidate catalyst may vary from 0.05 to 10 parts imidate per 100 parts fluoropolymer (by weight) (phr), particularly from 0.1 to 5 phr.

In other embodiments, the catalyst to form cross-links with the nitrogen-containing cure site monomer has the general formula $R_1R_2R_3N\cdot HA$, wherein the group HA is an acid, and each $R_1$, $R_2$, and $R_3$ is, independently, the same or a different $C_1$ to $C_{20}$ alkyl group, a $C_3$ to $C_{20}$ cyclic or heterocyclic group, $R_f(CH_2)_x$— wherein $R_f$ is a $C_1$ to $C_8$ linear or branched fluorinated alkyl group, cycloalkyl group, or oxyalkyl group and x is from 1 to 4 or a bond to another R group such that the nitrogen is bonded to or part of an imino or heterocyclic group. Two or more R groups may be linked to form a cyclic, bicyclic, or aromatic group, optionally comprising a heteroatom. Particular examples of such catalysts are described, for instance, in U.S. Pat. No. 6,794,457 (Grootaert et al.).

Still further embodiments of the catalyst to form cross-links with the nitrogen-containing cure site monomer include divalent metal amine complexes such as those described in U.S. Pat. No. 6,657,012 (Grootaert et al.). The divalent metal amine complexes include those given by the general formula:

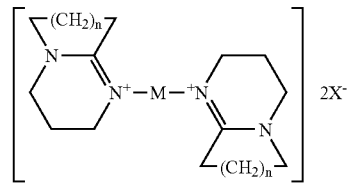

wherein M is a divalent metal, X is an anionic group, and n is from 2 to 6.

In yet further embodiments, the catalyst to form triazine cross-links with the nitrogen-containing cure site monomer is a catalyst composition that includes a compound having the general formula $\{R(A_n)\}^{(-n)}\{QR'_k{}^{(+)}\}_n$ or the precursors thereof added separately or as a mixture. In the general formula $\{R(A_n)\}^{(-n)}\{QR'_k{}^{(+)}\}_n$, R is selected from a $C^1$-$C_{20}$ alkyl, $C_2$-$C_{20}$ alkenyl, $C_3$-$C_{20}$ cycloalkyl or cycloalkenyl, and a $C_6$-$C_{20}$ aryl or aralkyl, which may be nonfluorinated, partially fluorinated, or perfluorinated, $\{R(A)_n\}^{(-n)}$ is an acid anion or an acid derivative anion, and n is the number of A groups in the anion. Q is selected from phosphorous, nitrogen, sulfur, arsenic, and antimony, each R' is independently selected from hydrogen and a substituted or unsubstituted $C_1$-$C_{20}$ alkyl group, a $C_2$-$C_{20}$ alkenyl group, and a $C_6$-$C_{20}$ aryl or aralkyl group.

In yet further embodiments, for the catalyst composition described above, A is selected from the group consisting of $CO_2^-$; —$O^-$ wherein R is selected from aryl or alkyl, and $C_nF_{2n+1}CH_2$— wherein n is selected from 1 to 100; $SO_3^-$; $SO_2^-$; $SO_2NH^-$; $PO_3^-$; $CH_2OPO_3^-$; $(CH_2)_2PO_2^-$; $C_6H_4O^-$; $OSO_3^-$; $SO_2NR'^-$; $SO_2NSO_2R'^-$; and $SO_2CRSO_2R'^-$, wherein R and R' are each as defined above.

In some embodiments, $R(A_n)^{n-}$ is given by the general formula:

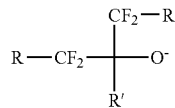

wherein each R independently is H, halo, alkyl, aryl, aralkyl, or cycloalkyl, and which also may be halogenated, fluorinated, or perfluorinated, further wherein two or more of R and R' groups may together form a ring, and each R group independently may contain one or more heteroatom(s), and wherein R' is the same as R with the proviso that R' cannot be halo.

In further embodiments of the catalyst composition, a precursor of $QR'_k$ is selected from the group consisting of phenyltrimethylammonium, tetrapentylammonium, tetrapropylammonium, tetrahexylammonium, tetraheptylammonium, tetramethylammonium, tetrabutylammonium, tributylbenzylammonium, tributylallylammonium, tetrabenzylammonium, tetraphenylammonium, diphenyldiethylaminoammonium, triphenylbenzylammonium, 8-benzyl-1,8-diazabicyclo[5.4.0]undec-7-enium, benzyltris (dimethylamino)phosphonium, and bis(benzyldiphenylphosphine)iminium.

In still other embodiments of the catalyst composition, a precursor of $QR'_k$ is selected from the group consisting of tetramethylphosphonium, tributylallylphosphonium, tributylbenzylphosphonium, dibutyldiphenylphosphonium, tetrabutylphosphonium, tributyl(2-methoxy)propylphosphonium, triphenylbenzylphosphonium, and tetraphenylphosphonium.

In other embodiments of the catalyst composition, a precursor of $R(A)_n$ has the general formula selected from the group consisting of RCOOM, $ROSO_3M$, RSO3M, and ROM, wherein M is selected from a hydrogen, an alkali metal, or an alkaline earth metal. Further examples of catalyst compositions include those in which $R(A_n)$ is $^{(-)}OOC-(CX_2)_t-COO^{(-)}$, wherein t is from 0 to 10 and each X is independently selected from H, F, and Cl.

In still further embodiments, the catalyst to form triazine cross-links with the nitrogen-containing cure site monomer may be an organotin compound such as tetraphenyltin and other embodiments known in the art to act as such a catalyst.

In some embodiments, the hydrotalcite may help to catalyze the formation of triazine cross-links. In such embodiments, the hydrotalcite acts as a co-catalyst wherein a further catalyst as described above is also added. The hydrotalcite may, in some instances, also serve as a filler that gives good water swell resistance.

The fluoropolymer compositions described herein may comprise, in place of or in addition to a catalyst to form cross-links with the nitrogen-containing cure site monomer, curatives that may participate in curing the nitrogen-containing cure sites. These curatives include, for instance, bisaminophenols and bisamidooximes.

The fluoropolymer may also be cured using one or more peroxide curatives along with the catalyst to form cross-links with the nitrogen-containing cure site monomers. Suitable peroxide curatives are generally those that generate free radicals at curing temperatures. Dialkyl peroxide and bis(dialkyl peroxide), each of which decomposes at a temperature of above about 50° C., are particular examples. Particular examples include a tertiarybutyl peroxide, which has a tertiary carbon atom attached to a peroxy oxygen atom. Among the peroxides of this type are 2,5-dimethyl-2,5-(tertiarybutylperoxy)hexyne-3 and 2,5-dimethyl-2,5-di(tertiarybutylperoxy)hexane. Other peroxides include those selected from such compounds as dicumyl peroxide, dibenzoyl peroxide, tertiarybutyl perbenzoate, a,a'-bis(t-butylperoxydiisopropylbenzene), and di[1,3-dimethyl-3-(t-butylperoxy)-butyl]carbonate. In some embodiments, about 3 parts peroxide per 100 parts of perfluoroelastomer is used.

The fluoropolymer compositions may further comprise any further material employed in curable fluoroelastomer formulations. For example, the composition may further comprise a co-agent to participate in a peroxide cure. The co-agent may, in some embodiments, comprise a polyunsaturated compound that is capable of cooperating with the peroxide to provide a useful curing of the fluoropolymer. Such co-agents can generally be added in an amount of from 0.1 to 10 parts per hundred parts of fluoropolymer, for instance, from 1 to 5 parts per hundred. Examples of co-agents to participate in a peroxide cure include triallyl cyanurate, triallyl isocyanurate, tri(methylallyl isocyanurate), tris(diallylamine)-s-triazine, triallyl phosphate, N,N-diallyl acrylamide, hexaallyl phosphoramide, N,N,N',N'-tetraallyl malonamide; trivinyl isocyanurate, 2,4,6-trivinyl methyltrisiloxane, tri(5-norbornene-2-methylene)cyanurate, 1,3,5-trivinyl cyclohexane, tetravinyl silane, and tetraallyl silane. Other useful co-agents include the bis-olefins described in EP 0,661,304 A1, EP 0,784,064 A1, and EP 0,769,521 A1, including those of the general formula $CH_2=CHR_fCH=CH_2$, wherein one or more H atoms may be replaced with halogen atoms, such as fluorine, and $R_f$ is a $C_1$ to $C_{10}$ linear or branched and at least partially fluorinated alkylene, cycloalkylene, or oxyalkylene. Similarly, polymers containing pendant groups of $CH_2=CHR_f$ are useful as curatives. Such curatives are described, for instance, in U.S. Pat. No. 5,585,449.

In some embodiments, a mixture or combination of co-agents may display improvements over the use of a single co-agent. For instance, mixtures of tetraallylsilane with triallyl isocyanurate may give better processing (e.g., mold release) over trially isocyanurate alone.

The fluoropolymer compositions described herein may further contain additives, such as carbon black, stabilizers, plasticizers, lubricants, fillers, fumed silicas (e.g., Aerosil® R-972 available from Degussa, Parsippany, N.J.), perfluoropolyethers, and processing aids, any of which are familiar to fluoropolymer compounding, provided that the fillers have adequate stability for the intended service conditions.

Carbon black fillers generally may be used to affect properties such as modulus, tensile strength, elongation, hardness, abrasion resistance, conductivity, and processability of the compositions. Examples of carbon black include MT blacks (medium thermal black) designated N-991, N-990, N-908, and N-907; FEF N-550; and large particle size furnace blacks. When large size particle black is used, from 1 to 70 parts filler per hundred parts fluoropolymer is generally sufficient.

In some embodiments, the dual cure system described herein (i.e., nitrogen-containing cure site monomer cross-link and peroxide cure) provides increased cross-link density and therefore improved properties such as compression set resistance, chemical resistance, and/or heat resistance vis à vis compositions comprising either a peroxide cure alone or a nitrogen-containing cure site monomer cure alone. The nitrogen containing cure site monomer cross-link, particularly the triazine cross-link, has traditionally been found to be unstable against high temperature water and steam environments, at least when compared to peroxide-cured compositions. What the present inventors have found is that the addition of hydrotalcite to the dual cure system allows for the benefit of, for instance, the triazine cross-link (such as low compression set), while reducing the detrimental water instability commonly associated with triazine cross-linked elastomers.

The fluoropolymer compositions described herein are curable, and can be prepared by mixing one or more fluoropolymers, a catalyst to form triazine cross-links with the nitrogen-containing cure site monomer, an organic peroxide, a co-agent to participate in a peroxide cure, and a hydrotalcite compound. Any other desirable additives may also be added. The mixing may take place in conventional rubber processing equipment. The desired amounts of compounding ingredients can be added to the unvulcanized fluoropolymer and intimately admixed or compounded therewith by employing any of the usual rubber mixing devices such as internal mixers, roll mills, or any other convenient mixing device. The temperature of the mixture during the mixing process typically should not rise above about 120° C. During mixing, it is preferable to distribute the components uniformly throughout the composition.

The fluoropolymer compositions of the present description include compositions comprising a mixture of fluoropolymer gums capable of being cured to give a fluoroelastomer, and fluoroplastic polymers having nitrogen-containing cure sites. In such embodiments, the fluoroplastic may comprise a nitrogen-containing cure site and units derived from one or more fluorinated monomers. These compositions may be further used to provide cured, shaped articles and latex blends. The nitrogen-containing cure sites may be provided by a nitrogen-containing cure site monomer such as, for instance, those described above. In particular embodiments, the one or more fluorinated monomers are selected from the group consisting of perfluoroolefins (such as tetrafluoroethylene, hexafluoropropylene, and the like), perfluorovinyl ethers (such as perfluoroalkylvinyl ethers, perfluoroalkoxyvinyl ethers, and the like), and combinations thereof.

The mixture may then be processed and shaped, such as by extrusion (e.g., into the shape of a film, tube, or hose) or by molding (e.g., in the form of a sheet or an o-ring). The shaped composition can then be heated to cure the fluoropolymer composition to form a cured article. The so-cured shaped composition may further be post-cured at a temperature above the curing temperature.

Molding or press curing of the compounded mixture is usually conducted at a temperature sufficient to cure the mixture in a desired time duration under suitable pressure. For instance, in the first curing step, the composition may be cured at a temperature that facilitates the formation of more peroxide cross-links than nitrogen cure site cross-links. A second heating may take place that initiates additional nitrogen cure site curing and peroxide curing. The second heating may be, for instance, post-curing (e.g., in an oven) at a temperature and time sufficient to complete triazine curing. The particular times, temperatures, and pressures can be selected by those skilled in the art and are not particularly limited.

In some embodiments, the perfluoroelastomers derived from curing the compositions described herein provide better heat and chemical resistance than standard peroxide-grade fluoroelastomers.

EXAMPLES

Unless otherwise noted, all parts, percentages, and ratios, in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: in=inch, g=grams, min=minutes, phr=parts per hundred parts of rubber, hr=hour, ° C.=degrees Celsius, ° F.=degrees Fahrenheit, psi=pounds per square inch, MPa=megapascals, and N-m=Newton-meter.

The following abbreviations are used throughout the Examples:

Examples 1-3 and Comparative Examples A-C

The fluoropolymer gum (300 g) was compounded on a two roll mill with the addition of the other additives as indicated in Table 1. The compounded mixtures were press-cured and subsequently the molded test sheets and O-rings were post-cured. After press-cure and post-cure, physical properties were measured with dumbbells cut from a post-cured test slab. Compression sets were measured on the O-rings.

TABLE 1

| Component | EX 1 | EX 2 | EX 3 | CE A | CE B | CE C |
|---|---|---|---|---|---|---|
| Polymer 2, phr | 97.6 | 100 | 48.8 | 97.6 | 100 | 48.8 |
| CM, phr | 3.0 | — | 3.0 | 3.0 | — | 3.0 |
| Polymer 1, phr | — | — | 48.8 | — | — | 48.8 |
| N-550, phr | 5.0 | — | 5.0 | 5.0 | — | 5.0 |
| TAS, phr | 1.5 | 1.5 | 1.5 | 1.5 | 1.5 | 1.5 |
| Varox DBPH-50HP | 2.0 | 2.0 | 2.0 | 2.0 | 2.0 | 2.0 |
| TAIC-DLC | 1.5 | 1.5 | 1.5 | 1.5 | 1.5 | 1.5 |
| DHT-4A | 2.0 | 2.0 | 2.0 | — | — | — |
| AEROSIL R972, phr | 1.5 | — | 1.5 | 1.5 | — | 1.5 |
| Residual nitrile content,[a,b] mole % | 0.262 | 0.503 | 0.094 | 0.177 | 0.66 | 0.507 |
| Triazine ratio[a,c] | 0.696 | 0.155 | 0.055 | 0.380 | −0.046 | 0.016 |

[a]After 16 hours 200° C. post cure; nitrile content and triazine ratio measured on samples containing no N-550 after full press-cure and post-cure.
[b]The residual nitrile content was obtained by correlating the FT-IR peak height at 2264 cm$^{-1}$ for a given sample to a calibration curve that was prepared by measuring the peak height at 2264 cm$^{-1}$ for a group of samples having a varying —CN content, which —CN content was determined by $^{19}$F NMR spectroscopy.
[c]The triazine ratio was measured by taking the interpolated and baseline corrected peak height from an FTIR spectrum of the peak between 1541 cm$^{-1}$ and 1578 cm$^{-1}$ (the triazine peak maximum is at 1556 cm$^{-1}$) and dividing it by the interpolated, baseline corrected peak height of the peak between 2216 cm$^{-1}$ and 2638 cm$^{-1}$ (the C—F stretch overtone)

Results

As indicated in Table 1, particularly when comparing Example 2 with Comparative Example B wherein no CM was

| ABBREVIATION | DESCRIPTION |
|---|---|
| AEROSIL R972 | Silica available under the trade designation "AEROSIL R972" from Degussa AG, Dusseldorf, Germany |
| TAS | Tetraallylsilane |
| Varox DBPH-50HP | An organic peroxide available commercially from R.T. Vanderbilt Co., Norwalk, CT |
| TAIC-DLC | Triallylisocyanurate dry liquid concentrate (72% active TAIC on an inert carrier) available commercially from Natrochem, Savannah, GA |
| DHT-4A | A synthetic hydrotalcite available commercially from Kyowa Chemical Industry Co., Kagawa, Japan |
| PMVE | perfluoro(methyl vinyl ether), available from Anles Plus, Saint Petersburg, Russia |
| MV5CN | $CF_2$=$CFO(CF_2)_5CN$, available from Anles Plus, Saint Petersburg, Russia |
| TBPPA | Bistetrabutylphosphonium perfluoroadipate; prepared as in U.S. Pat. No. 7,019,083 (Grootaert et al.) catalyst preparation neutralizing tetrabutylphosphonium hydroxide with perfluoroadipic acid. |
| Polymer 1 | Copolymer of 48.7 wt % TFE, 47.6 wt % PMVE and 3.7 wt % MV5CN |
| Polymer 2 | Copolymer of 47.8 wt % TFE, 47.0 wt % PMVE and 5.2 wt % MV5CN |
| CM (Catalyst Masterbatch) | Blend of 20% by weight TBPPA and 80% by weight of Polymer 1 |
| N-550 FEF Black | ASTM designated N-550 carbon black available under the trade designation "STATEX" from Colombian Chemicals, Brazil | present, the hydrotalcite in the above-described compositions promoted the formation of triazine cross-links. Further, in Examples 1 and 3 compared to Comparative Examples A and C, respectively, the hydrotalcite increased the amount of triazine present in each of the cured compositions. Rheology, physical properties, compression set, volume swell are shown in Tables 2-4.

Cure rheology tests were carried out using uncured, compounded samples using a rheometer marketed under the trade designation Moving Die Rheometer (MDR) Model 2000 by Alpha Technologies, Akron, Ohio, in accordance with ASTM D 5289-93a at 177° C., no pre-heat, 12 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ($t_S2$), the time for the torque to reach a value equal to $M_L+0.5(M_H-M_L)$, (t'50), and the time for the torque to reach $M_L+0.9(M_H-M_L)$, (t'90). Results are reported in Table 2 (below).

TABLE 2[a]

|  | EX 1 | EX 2 | EX 3 | CE A | CE B | CE C |
|---|---|---|---|---|---|---|
| $M_L$, in-lb | 1.06 | 1.08 | 1.23 | 0.76 | 0.85 | 0.85 |
| (N-m) | (0.120) | (0.122) | (0.139) | (0.086) | (0.096) | (0.096) |
| $M_H$, in-lb | 16.25 | 18.68 | 15.42 | 18.04 | 12.11 | 12.56 |
| (N-m) | (1.836) | (2.110) | (1.742) | (2.038) | (1.368) | (1.419) |
| $t_S2$, min | 2.83 | 1.67 | 3.07 | 2.32 | 1.71 | 2.63 |
| t'50, min | 5.73 | 3.58 | 6.24 | 6.92 | 3.2 | 5.49 |
| t'90, min | 15.94 | 9.97 | 15.63 | 19.06 | 10.54 | 16.5 |

[a]Rheology measurements were taken before adding N-550.

Press-cured sheets (150 mm×150 mm×2.0 mm) of the curable compositions prepared in Examples 1-3 and Comparative Examples A-C, except where indicated in Tables 3 and 4, were prepared for physical property determination by pressing at a pressure of about 6.9 MPa and a temperature of 177° C. (350° F.) for 15 min. Press-cured sheets were post-cured by exposure to heat under air at 200° C. (392° F.) for 16 hrs. All specimens were returned to ambient temperature before testing.

Physical Properties

Tensile strength at break, elongation at break, and modulus at 50% elongation were determined according to ASTM D 412-92 using samples cut from the corresponding specimen using ASTM Die D.

Hardness was measured using ASTM D 2240-85 Method A with a Type A-2 Shore Durometer.

Table 3 (below) reports physical properties of the post-cured sheets of the curable compositions of Examples 1-3 and Comparative Examples A-C except where indicated.

TABLE 3[aa,bb]

|  | EX 1 | EX 2 | EX 3 | CE A | CE B | CE C |
|---|---|---|---|---|---|---|
| Tensile Strength at Break, MPa (psi) | 14.78 (2143) | nm | 14.81 (2128) | 13.82 (2005) | nm | 16.62 (2410) |
| Elongation at Break, % | 101 | nm | 97 | 101 | nm | 119 |
| 50% Modulus, MPa (psi) | 4.65 (675) | nm | 4.85 (704) | 4.26 (618) | nm | 3.66 (531) |
| Shore A Hardness | 80 | nm | 77 | 79 | nm | 75 |

[a]"nm" means "not measured"
[b]N-550 was added prior to measuring physical properties Specimens of the curable compositions of Examples 1-3 and Comparative Examples A-C were press-cured and post-cured in a 214 O-ring (0.139 in cross section by 1.0 in ID). Compression set of the specimens was measured using ASTM 395-89 Method B. Results are reported in Table 4 (below) as a percentage of permanent set.

TABLE 4

|  | EX 1 | EX 2 | EX 3 | CE A | CE B | CE C |
|---|---|---|---|---|---|---|
| [a]Compression set, % | 35 | nm | 39 | 40 | nm | 43 |
| [b]Volume swell, % | 2.0 | nm | 1.4 | 3.2 | nm | 3.4 |

In Table 4 (above) "nm" means "not measured"
[a]230° C. for 70 hrs at 25% deflection
[b]aged in deionized water 168 hours at 230° C.

Various modifications and alterations of this invention may be made by those skilled in the art without departing from the scope and spirit of this invention, and it should be understood that this invention is not to be unduly limited to the illustrative embodiments set forth herein.

We claim:

1. A curable fluoropolymer composition comprising:

a) a fluoropolymer comprising interpolymerized units of tetrafluoroethylene, perfluoro(aliphatic vinyl)ether, and a nitrogen-containing cure site monomer;

b) a catalyst to form cross-links with the nitrogen-containing cure site monomer;

c) an organic peroxide;

d) a co-agent to participate in a peroxide cure; and e) a hydrotalcite compound.

2. The composition of claim 1 wherein the catalyst to form cross-links with the nitrogen-containing cure site monomer forms triazine cross-links.

3. The composition of claim 2 wherein the catalyst to form cross-links with the nitrogen-containing cure site monomer is selected from an amidine, bis-amidine, tris-amidine, or tetra-amidine.

4. The composition of claim 1 wherein the catalyst to form cross-links with the nitrogen-containing cure site monomer is a catalyst composition that includes a compound having the general formula $\{R(A_n)\}^{(-n)}\{QR'_k{}^{(+)}\}_n$, or the precursors thereof added separately or as a mixture, wherein R is selected from a $C_1$-$C_{20}$ alkyl, $C_2$-$C_{20}$ alkenyl, $C_3$-$C_{20}$ cycloalkyl or cycloalkenyl, and a $C_6$-$C_{20}$ aryl or aralkyl, further wherein R may be non-fluorinated, partially fluorinated, or perfluorinated, $\{R(A)_n\}^{(-n)}$ is an acid anion or an acid derivative anion, n is the number of A groups in the anion, Q is selected from phosphorous, nitrogen, sulfur, arsenic, and antimony, each R' is independently selected from hydrogen and a substituted or unsubstituted $C_1$-$C_{20}$ alkyl group, a $C_2$-$C_{20}$ alkenyl group, and a $C_6$-$C_{20}$ aryl or aralkyl group.

5. The composition of claim 4 wherein A is selected from the group consisting of $CO_2{}^-$; —$O^-$ wherein R is selected from aryl or alkyl, and $C_nF_{2n+1}CH_2$— wherein n is selected from 1 to 100; $SO_3{}^-$; $SO_2{}^-$; $SO_2NH^-$; $PO_3{}^-$; $CH_2OPO_3{}^-$; $(CH_2)_2PO_2{}^-$; $C_6H_4O^-$; $OSO_3{}^-$; $SO_2NR'^-$; $SO_2NSO_2R'^-$; and $SO_2CRSO_2R'$—, wherein R and R' are each as defined in claim 3.

6. The composition of claim 4 wherein $R(A_n)^{n-}$ is given by the general formula:

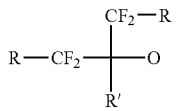

wherein each R independently is H, halo, alkyl, aryl, aralkyl, or cycloalkyl, and which also may be halogenated, fluorinated, or perfluorinated, further wherein two or more of R and R' groups may together form a ring, and each R group independently may contain one or more heteroatom(s), and wherein R' is the same as R with the proviso that R' cannot be halo.

7. The composition of claim 4 wherein a precursor of $QR'_k$ is selected from the group consisting of phenyltrimethylammonium, tetrapentylammonium, tetrapropylammonium, tetrahexylammonium, tetraheptylammonium, tetramethylammonium, tetrabutylammonium, tributylbenzylammonium, tributylallylammonium, tetrabenzylammonium, tetraphenylammonium, diphenyldiethylaminoammonium, triphenylbenzylammonium, 8-benzyl-1,8-diazabicyclo[5.4.0]undec-7-enium, benzyltris(dimethylamino)phosphonium, and bis(benzyldiphenylphosphine)iminium.

8. The composition of claim 4 wherein a precursor of $QR'_k$ is selected from the group consisting of tetramethylphosphonium, tributylallylphosphonium, tributylbenzylphosphonium, dibutyldiphenylphosphonium, tetrabutylphosphonium, tributyl(2-methoxy)propylphosphonium, triphenylbenzylphosphonium, and tetraphenylphosphonium.

9. The composition of claim 4 wherein a precursor of $R(A)_n$ has the general formula selected from the group consisting of RCOOM, $ROSO_3M$, $RSO_3M$, and ROM, wherein M is selected from a hydrogen, an alkali metal, or an alkaline earth metal.

10. The composition of claim 4 wherein $R(A_n)$ is $^{(-)}OOC—(CX_2)_t—COO^{(-)}$, wherein t is from 0 to 10 and each X is independently selected from H, F, and Cl.

11. The composition of claim 1 wherein the catalyst to form cross-links with the nitrogen-containing cure site monomer is an ammonia-generating compound.

12. The composition of claim 1 wherein the catalyst to form cross-links with the nitrogen-containing cure site monomer is an organotin compound.

13. The composition of claim 1 wherein the nitrogen-containing cure site monomer comprises a nitrile-containing monomer.

14. The composition of claim 1 wherein the co-agent to participate in a peroxide cure is selected from triallyl cynaurate, triallyl isocyanurate, tri(methylallyl)isocyanurate, tris(diallylamine)-s-triazine, triallyl phosphate, N,N-diallyl acrylamide, hexaallyl phosphoramide, N,N,N',N'-tetraalkyl tetraphthalamide, N,N,N',N'-tetraallyl malonamide, trivinyl isocyanurate, 2,4,6-trivinyl methyltrisiloxane, tri(5-norbornene-2-methylene)cyanurate, 1,3,5-trivinyl cyclohexane, tetravinyl silane, tetraallyl silane, and combinations thereof.

15. The composition of claim 1 further comprising a fumed silica.

16. The composition of claim 1 wherein the co-agents to participate in a peroxide cure is selected from those having the general formula: $CH_2=CHR_fCH=CH_2$, wherein $R_f$ is a fluorinated $C_1$ to $C_{10}$ linear alkylene, branched alkylene, cycloalkylene, or oxyalkylene.

17. The composition of claim 16 wherein $R_f$ is perfluorinated.

18. The composition of claim 1 further comprising a fluoroplastic comprising a nitrogen-containing cure site and units derived from one or more fluorinated monomers.

19. The composition of claim 18 wherein the fluorinated monomer is selected from the group consisting of perfluoroolefins, perfluorovinyl ethers, and combinations thereof.

20. A curable fluoropolymer composition comprising:
   a) a fluoropolymer comprising interpolymerized units of tetrafluoroethylene, perfluoro(aliphatic vinyl)ether, and a nitrogen-containing cure site monomer;
   b) a curative to form cross-links with the nitrogen-containing cure site monomer;
   c) an organic peroxide;
   d) a co-agent to participate in a peroxide cure; and
   e) a hydrotalcite compound.

21. The composition of claim 20 wherein the curative to form cross-links with the nitrogen-containing cure site monomer is selected from bisaminophenols and bisamidooximes.

22. An article comprising the cured fluoropolymer reaction product of:
   a) a fluoropolymer comprising interpolymerized units of tetrafluoroethylene, perfluoro(aliphatic vinyl)ether, and a nitrogen-containing cure site monomer;
   b) a catalyst forming cross-links with the nitrogen-containing cure site monomer;
   c) an organic peroxide;
   d) a co-agent participating in a peroxide cure; and
   e) a hydrotalcite compound.

23. A method for forming cured article comprising:
   a) mixing a fluoropolymer comprising interpolymerized units of tetrafluoroethylene, perfluoro(aliphatic vinyl) ether, and a nitrogen-containing cure site monomer with a catalyst forming cross-links with the nitrogen-containing cure site monomer, an organic peroxide, a co-agent participating in a peroxide cure; and a hydrotalcite compound to form a curable composition;
   b) shaping the curable composition to form a shaped composition;
   c) curing the shaped composition at a curing temperature; and
   d) optionally post-curing the shaped composition at a temperature above the curing temperature.

24. A method for forming a cured article comprising:
   a) mixing a fluoropolymer comprising interpolymerized units of tetrafluoroethylene, perfluoro(aliphatic vinyl) ether, and a nitrogen-containing cure site monomer with a catalyst forming cross-links with the nitrogen-containing cure site monomer, an organic peroxide, a co-agent participating in a peroxide cure; and a hydrotalcite compound to form a curable composition;
   b) curing the curable composition to give a cured composition;
   c) shaping the cured composition; and
   d) optionally post-curing the shaped composition at a temperature above the curing temperature.

* * * * *

UNITED STATES PATENT AND TRADEMARK OFFICE
CERTIFICATE OF CORRECTION

| | | |
|---|---|---|
| PATENT NO. | : 7,592,386 B2 | Page 1 of 2 |
| APPLICATION NO. | : 11/561677 | |
| DATED | : September 22, 2009 | |
| INVENTOR(S) | : Werner M. Grootaert | |

It is certified that error appears in the above-identified patent and that said Letters Patent is hereby corrected as shown below:

Column 2

Line 11; delete "$Mg_6Al_2(OH)_{16}CO_3.4H_2O$" and insert
-- $Mg_6Al_2(OH)_{16}CO_3 \cdot 4H_2O$ --, therefor.

Line 12; delete "Strichtite" and insert -- Stichtite --, therefor.

Line 13; delete "$Mg_6Cr_2(OH)_{16}CO_3.4H_2O;$" and insert
-- $Mg_6Cr_2(OH)_{16}CO_3 \cdot 4H_2O;$ --, therefor.

Line 13-14; delete "$Mg_6Fe(III)_2(OH)_{16}CO_3.4H_2O;$" and insert
-- $Mg_6Fe(III)_2(OH)_{16}CO_3 \cdot 4H_2O;$ --, therefor.

Line 14; delete "$Mg_6Mn(III)_2(OH)_{16}CO_3.4H_2O;$" and insert
-- $Mg_6Mn(III)_2(OH)_{16}CO_3 \cdot 4H_2O;$ --, therefor.

Line 18; delete "$Mg_6Al_2(OH)_{16}CO_3.4H_2O$" and insert
-- $Mg_6Al_2(OH)_{16}CO_3 \cdot 4H_2O$ --, therefor.

Line 19-20; delete "$Mg_{4.5}Al_2(OH)_{13}CO_3.3.5H_2O,$" and insert
-- $Mg_{4.5}Al_2(OH)_{13}CO_3 \cdot 3.5H_2O,$ --, therefor.

Line 20-21; delete "$Mg_4Al_2(OH)_{12}CO_3.3.5H_2O,$" and insert
-- $Mg_4Al_2(OH)_{12}CO_3 \cdot 3.5H_2O,$ --, therefor.

Line 21; delete "$Mg_5Al_2(OH)_{12}CO_3.4H_2O,$" and insert
-- $Mg_5Al_2(OH)_{14}CO_3 \cdot 4H_2O,$ --, therefor.

Line 21-22; delete "$Mg_3Al_2(OH)_{10}CO_3.1.7H_2O,$" and insert
-- $Mg_3Al_2(OH)_{10}CO_3 \cdot 1.7H_2O,$ --, therefor.

Signed and Sealed this

Fourth Day of May, 2010

David J. Kappos
*Director of the United States Patent and Trademark Office*

Column 2 (Continued)

Line 22; delete "$Mg_3ZnAl_2(OH)_{12}CO_3.xH_2O$," and insert
-- $Mg_3ZnAl_2(OH)_{12}CO_3 \cdot xH_2O$, --, therefor.

Line 32; delete "$[(M_1^{2+})_a(M_2^{2+})_b](M^{3+})_y(OH)_{2x+3y-2}(A^{n-})_{y/n}.wH_2O$" and insert
-- $[(M_1^{2+})_a(M_2^{2+})_b](M^{3+})_y(OH)_{2x+3y-2}(A^{n-})_{y/n} \cdot wH_2O$ --, therefor.

Line 37; delete "$Zn^{22+}$," and insert -- $Zn^{2+}$, --, therefor.

Column 5

Line 51; delete "$R_1R_2R_3N.HA$," and insert -- $R_1R_2R_3N \cdot HA$, --, therefor.

Column 6

Line 19; delete "$C^1-C_{20}$" and insert -- $C_1-C_{20}$ --, therefor.

Column 7

Line 6; delete "RSO3M," and insert -- $RSO_3M$, --, therefor.

Column 10

Line 35; delete "overtone)" and insert -- overtone). --, therefor.

Column 11

Line 52; delete "TABLE $3^{aa,bb}$" and insert -- TABLE $3^{a,b}$ --, therefor.

Column 12

Line 66; Claim 5, delete "$SO_2CRSO_2R'$—," and insert -- $SO_2CRSO_2R''$, --, therefor.

Column 13

Line 5-8; Claim 6, delete "                    " and insert --                    --, therefor.

Line 35; Claim 9, delete "RSO3M," and insert -- $RSO_3M$, --, therefor.

Line 52-53; Claim 14, delete "cynaurate," and insert -- cyanurate, --, therefor.